us010977129B2

(12) United States Patent
Gao et al.

(10) Patent No.: US 10,977,129 B2
(45) Date of Patent: Apr. 13, 2021

(54) METHOD AND DEVICE FOR MANAGING A HYBRID STORAGE DISK ARRAY

(71) Applicant: EMC IP Holding Company LLC, Hopkinton, MA (US)

(72) Inventors: Hongpo Gao, Beijing (CN); Qingyun Liu, Beijing (CN); Geng Han, Beijing (CN); Baote Zhuo, Beijing (CN); Ruiyong Jia, Beijing (CN); Ree Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 256 days.

(21) Appl. No.: 16/167,701

(22) Filed: Oct. 23, 2018

(65) Prior Publication Data

US 2019/0155692 A1 May 23, 2019

(30) Foreign Application Priority Data

Oct. 27, 2017 (CN) .......................... 201711022181.8

(51) Int. Cl.
*G06F 11/00* (2006.01)
*G06F 11/10* (2006.01)

(52) U.S. Cl.
CPC ................................ *G06F 11/1088* (2013.01)

(58) Field of Classification Search
CPC .... G06F 3/0689; G06F 3/0619; G06F 3/0611; G06F 11/1658; G06F 11/1084; H04L 67/1095
See application file for complete search history.

(56) References Cited

U.S. PATENT DOCUMENTS

| 4,593,354 | A | * | 6/1986 | Ushiro | G06F 12/0866 711/E12.019 |
| 5,682,499 | A | * | 10/1997 | Bakke | G06F 3/0601 711/100 |
| 6,647,514 | B1 | * | 11/2003 | Umberger | G06F 11/1092 714/42 |
| 7,870,172 | B1 | * | 1/2011 | Sarma | G06F 16/17 707/822 |
| 8,307,159 | B2 | * | 11/2012 | McKean | G06F 11/2094 711/114 |
| 8,661,218 | B1 | * | 2/2014 | Piszczek | G06F 11/1088 711/167 |
| 8,689,040 | B2 | * | 4/2014 | Kidney | G06F 11/1088 714/6.1 |

(Continued)

*Primary Examiner* — Bryce P Bonzo
*Assistant Examiner* — Jeison C Arcos
(74) *Attorney, Agent, or Firm* — BainwoodHuang (57) ABSTRACT

Various embodiments of the present disclosure generally relate to a method and a device for managing a hybrid storage disk array. Specifically, the method can include: in response to a first data portion of a first extent in a first set of extents of a first type of storage disk being unavailable, obtaining a metadata portion of a second extent in a second set of extents of the second type of storage disk. The method can also include: reading from the metadata portion reconstruction information for reconstructing the first data portion; and reconstructing, based on the reconstruction information, the first data portion on a third extent in the first set of extents. In addition, there is also provided accordingly a system, an apparatus and a computer program product.

20 Claims, 6 Drawing Sheets

(56) References Cited

U.S. PATENT DOCUMENTS

| | | | |
|---|---|---|---|
| 8,793,290 B1* | 7/2014 | Pruthi | G06F 3/0644 |
| | | | 707/821 |
| 8,850,130 B1* | 9/2014 | Aron | G06F 3/0641 |
| | | | 711/150 |
| 8,880,787 B1* | 11/2014 | Kimmel | G06F 11/1464 |
| | | | 711/103 |
| 8,898,388 B1* | 11/2014 | Kimmel | G06F 12/0893 |
| | | | 711/114 |
| 9,600,200 B1 | 3/2017 | Wallace et al. | |
| 9,720,835 B1 | 8/2017 | Shilane et al. | |
| 9,798,754 B1 | 10/2017 | Shilane et al. | |
| 9,804,939 B1* | 10/2017 | Bono | G06F 11/1088 |
| 9,892,044 B1 | 2/2018 | Wallace et al. | |
| 9,892,045 B1 | 2/2018 | Douglis et al. | |
| 9,921,963 B1 | 3/2018 | Li et al. | |
| 10,310,943 B2* | 6/2019 | Huang | G06F 3/067 |
| 10,474,539 B1 | 11/2019 | Yadav et al. | |
| 10,509,769 B1 | 12/2019 | Shilane et al. | |
| 10,664,268 B2 | 5/2020 | Chen et al. | |
| 10,691,354 B1 | 6/2020 | Kucherov | |
| 2002/0059539 A1* | 5/2002 | Anderson | G06F 11/2056 |
| | | | 714/6.22 |
| 2006/0064416 A1* | 3/2006 | Sim-Tang | G06F 16/174 |
| 2010/0079885 A1* | 4/2010 | McKean | G06F 11/1662 |
| | | | 360/15 |
| 2011/0035548 A1* | 2/2011 | Kimmel | G06F 16/1805 |
| | | | 711/114 |
| 2011/0320865 A1* | 12/2011 | Jain | G06F 16/13 |
| | | | 714/6.22 |
| 2012/0030410 A1* | 2/2012 | Cho | G06F 13/28 |
| | | | 711/103 |
| 2012/0084600 A1* | 4/2012 | Kidney | G06F 11/1088 |
| | | | 714/6.13 |
| 2012/0096217 A1* | 4/2012 | Son | G06F 3/0616 |
| | | | 711/103 |
| 2012/0198174 A1* | 8/2012 | Nellans | G06F 3/0655 |
| | | | 711/133 |
| 2012/0254508 A1* | 10/2012 | Walls | G06F 3/0688 |
| | | | 711/103 |
| 2012/0284587 A1* | 11/2012 | Yu | G06F 3/0631 |
| | | | 714/773 |
| 2013/0024641 A1* | 1/2013 | Talagala | G06F 11/3409 |
| | | | 711/170 |
| 2013/0047029 A1* | 2/2013 | Ikeuchi | G06F 11/1662 |
| | | | 714/6.22 |
| 2014/0136753 A1* | 5/2014 | Tomlin | G06F 12/0246 |
| | | | 711/103 |
| 2014/0164825 A1* | 6/2014 | Grcanac | G06F 11/1088 |
| | | | 714/6.24 |
| 2015/0205669 A1* | 7/2015 | Sundaram | G06F 3/0689 |
| | | | 714/6.23 |
| 2015/0212760 A1* | 7/2015 | Goel | G06F 3/0605 |
| | | | 714/6.3 |
| 2019/0196910 A1* | 6/2019 | Gu | G06F 11/1088 |

* cited by examiner

METHOD AND DEVICE FOR MANAGING A HYBRID STORAGE DISK ARRAY

RELATED APPLICATIONS

This application claim priority from Chinese Patent Application Number CN 201711022181.8, filed on Oct. 27, 2017 at the State Intellectual Property Office, China, titled "METHODS AND DEVICES FOR MANAGING HYBRID STORAGE DISK ARRAY" the contents of which is herein incorporated by reference in its entirety.

FIELD

Various embodiments of the present disclosure generally relate to the field of computers, and more specifically, to a method and a device for managing a hybrid storage disk array.

BACKGROUND

Redundant Arrays of Independent Disk (RAID) is a hard disk group composed of a plurality of independent hard disks combined in different manners. From users' perspective, the disk array RAID is like a disk, but can provide greater storage capability than a single disk and can also provide data backup. When data of an extent is damaged, the damaged data can be recovered using the data backup, so as to protect user data. Different compositions of the disk array can be referred to as RAID level, e.g., RAID0, RAID1, RAID5 and the like.

With the rapid development of information technology, the traditional construction mode of the RAID storage disk array cannot satisfy the requirements regarding high integration, fast and flexible deployment, on-demand allocation and the like. To adapt to users' requirements, a new generation of the hybrid RAID storage disk array uniformly "pools" all storage devices through a virtualization technique, so as to shield heterogeneity of different storage devices and exploit advantages of various storage devices. The redundancy requirement in case of a presence of a damaged disk is satisfied by building, configuring and applying a storage pool. This technique not only achieves resource sharing and on-demand allocation, but also reduces maintenance costs and improves management efficiency. However, it is a technical problem to be addressed by those skilled in the art to efficiently and conveniently implement construction of a lightweight storage pool.

SUMMARY

Various embodiments of the present disclosure provide a method, a device and a computer program product for managing a hybrid storage disk array.

According to a first aspect of the present disclosure, there is provided a method for managing a hybrid storage disk array. The method includes: in response to a first data portion of a first extent in a first set of extents of a first type of storage disk being unavailable, obtaining a metadata portion of a second extent in a second set of extents of the second type of storage disk. The method can also include: reading from the metadata portion reconstruction information for reconstructing the first data portion; and reconstructing, based on the reconstruction information, the first data portion on a third extent in the first set of extents.

In an example embodiment, the method can further include: in response to performing a write operation on the first data portion, determining a log space in the metadata portion. The method can also include: reading from the log space a log for performing the write operation; and performing, based on the log, a write operation on the first data portion reconstructed on the third extent.

In an example embodiment, wherein an I/O load of the second extent in which the metadata portion is included is below a threshold, the I/O load being determined based on the number of I/O being processed by the second extent and a maximum allowed number of I/O.

In an example embodiment, wherein a degree of wear of the second extent in which the metadata portion is included is below a threshold, the degree of wear being determined based on times the second extent has been erased and allowed times of erasures.

In an example embodiment, wherein a usage rate of a second data portion in the second extent in which the metadata portion is included is below a threshold, the usage rate being determined based on an occupied space of the second data portion and allowed maximum space.

In an example embodiment, wherein an access speed of the second type of storage disk exceeds an access speed of the first type of storage disk.

In an example embodiment, wherein the first type of storage disk is a hard disk drive HDD, and the second type of storage disk is a solid-state drive (SSD).

According to a second aspect of the present disclosure, there is provided a device for managing a hybrid storage disk array. The device includes: a processor and a memory coupled to the processor and having instructions stored thereon for execution by the processor. The instructions, when executed by the processor, cause the device to: in response to a first data portion of a first extent in a first set of extents of a first type of storage disk being unavailable, obtain a metadata portion of a second extent in a second set of extents of the second type of storage disk; read from the metadata portion reconstruction information for reconstructing the first data portion; and reconstruct, based on the reconstruction information, the first data portion on a third extent in the first set of extents.

According to a third aspect of the present disclosure, there is provided a computer program product. The computer program product is tangibly stored on a non-transient computer-readable media and includes machine-executable instructions. The machine-executable instructions, when executed, cause a machine to perform any steps of the method described according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text can also include other explicit and implicit definitions.

Figure 1:
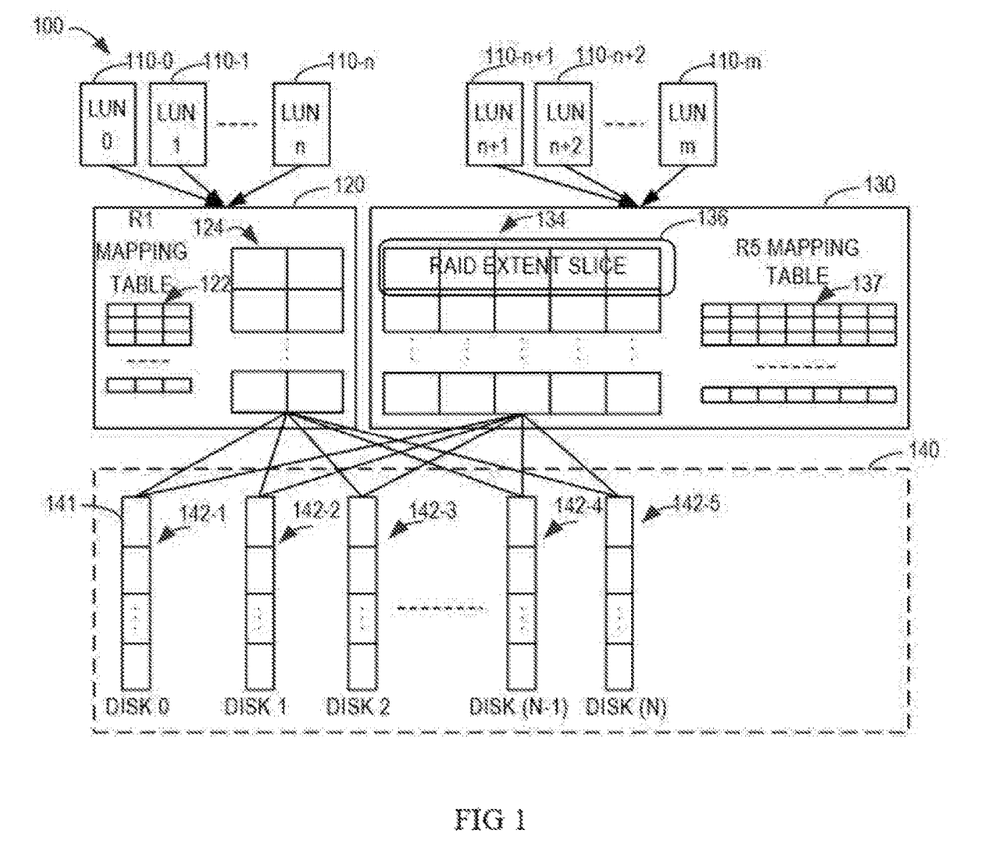
FIG. 1 illustrates a schematic diagram of architecture 100 for managing a disk pool in the prior art.

FIG. 1 illustrates a schematic diagram of architecture 100 for managing a disk pool in the prior art. The architecture 100 includes a RAID virtualization layer (e.g., RAID1 virtualization layer 120 and RAID5 virtualization layer 130) and a physical storage layer 140. The physical storage layer 140 consists of a plurality of (such as N+1) physical disks 142-1, 142-2, 142-3, . . . , 142-4 and 142-5 for providing physical storage space. These disks can be collectively or individually referred to as disk 142. Each disk 142 is divided into a plurality of extents 141. Each of the plurality of extents 141 can have the same storage capacity. The extent 141 sometimes can also be known as a disk extension, a storage unit and the like while the physical storage layer 140 can also be known as a disk pool. In some cases, one or more new disks can be added into the physical storage layer 140 to expand storage capacity.

As shown in FIG. 1, the RAID virtualization layer includes the RAID1 virtualization layer 120 and the RAID5 virtualization layer 130. The RAID5 virtualization layer 130, for example, includes an R5 mapping table 137 and a RAID5 134, and the RAID5 134 can include a plurality of extent slices 136. Each extent slice 136 is mapped to one or more extents 141 of the physical storage layer 140 according to the R5 mapping table 137, wherein the R5 mapping table 137 indicates mapping relationships between the extent slice 136 and one or more extents 141. The number of extents 141 included in each extent slice 136 can indicate width of the extent slice, also known as RAID width. When a user writes data into a certain extent slice 136 of the RAID5 134, the written data will be stored in the extent 141 to which the extent slice 136 is mapped. Similarly, the RAID1 virtualization layer 120 of the RAID1 level includes R1 mapping table 122 and RAID1 124 and has similar architecture with that of the RAID5 virtualization layer 130 of the RAID5 level, thus relevant descriptions are omitted here.

Depending on characteristics, such as redundancy level, performance and the like, the RAID virtualization layer can have different levels. For example, the RAID level can include RAID1, RAID2 . . . RAID5. Taking the RAID5 virtualization layer 130 of the RAID5 level for example, each extent slice 136 includes five extents 141, four of which can contain data and another one can include parity information. The extent 141 consisting of parity information can recover data of other extents 141 of the extent slice 136. It should be understood that the RAID of any other levels can be implemented in the system 100.

It should be appreciated that device and/or arrangement shown in FIG. 1 is just an example. In other examples, the architecture 100 can include any appropriate number of disks 142 and RAID built thereon. The types of the built RAID may be identical or different. In some examples, depending on the architecture of the storage system, other logical layers, such as Flare Logical Unit Number (LUN) layer, mapping LUN layer and/or Thin LUN layer, might also exist above the RAID virtualization layer 110 for processing read/write requests or other requests from a user. These LUN (e.g., 110-0, 110-1, . . . , 110-n, 110-n+1, 110-n+2, . . . , 110-m) can be collectively or individually known as LUN 110.

Figure 2:
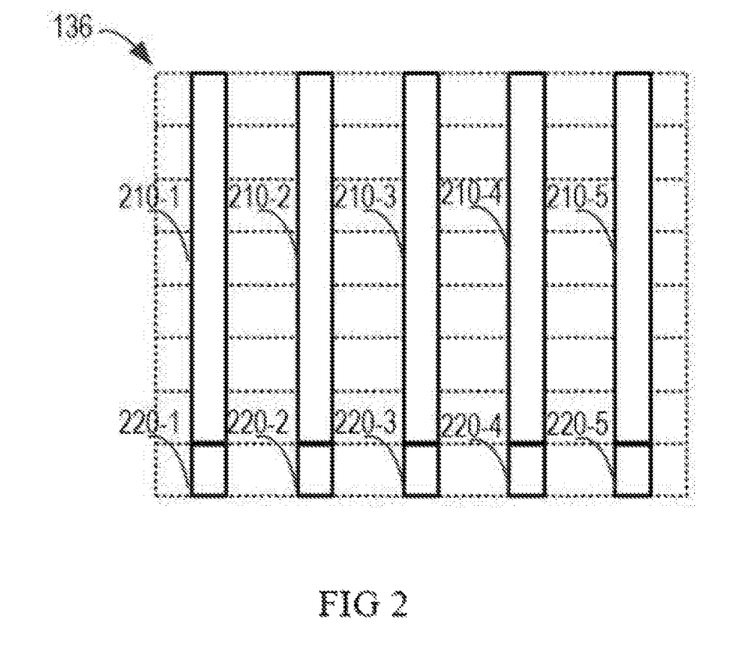
FIG. 2 illustrates a schematic diagram of a local structure 200 of an extent slice shown in FIG. 1.

FIG. 2 illustrates a schematic diagram of a local structure 200 of the extent slice shown in FIG. 1. As shown in FIG. 2, each extent slice 136 includes five extents 141. Specifically, a part (e.g., 210-1, 210-2, 210-3, 210-4 and 210-5) of the five extents 141 is used for storing data and can be collectively or individually known as data portion 210; while the other part (e.g., 220-1, 220-2, 220-3, 220-4 and 220-5) is used for storing metadata and can be collectively or individually known as metadata portion 220. Each metadata portion 220 can include a state field (e.g., 1 bit), a parity field (e.g., 7 bits) and a reconstruction field (e.g., 16 bits), wherein the state field indicates state of the extent 141 (e.g., valid or faulted), the parity field verifies data stored on the data portion 210 in the extent 141, and the reconstruction field stores data required for reconstructing the extent 141.

In the prior art, a Hard Disk Drive (HDD) is usually employed as the physical disk 142 in the physical storage layer 140. However, due to the inherent characteristics of HDD, a magnetic head of the HDD is required to perform I/O operations mechanically on other extents 141 during recovery of the faulted extents 141. Since the mechanical movement of the magnetic head causes delay, the I/O response time of the physical storage layer 140 will be greatly affected.

To avoid the above problem, the embodiments of the present disclosure introduce into the physical storage layer 140 a Solid-State Drive (SSD) that requires no mechanical operations and provides fast access, and employ the SSD storage for reconstructing metadata of the HDD extent, so as to significantly improve I/O response efficiency of the physical storage layer 140.

Principles of the present disclosure will be described below with reference to several example embodiments shown in the drawings. Although the drawings illustrate the preferred embodiments of the present disclosure, it should be appreciated that these embodiments are described merely to enable those skilled in the art to better understand and further implement the present disclosure, rather than to restrict the scope of the present disclosure in any manners.

Figure 3:
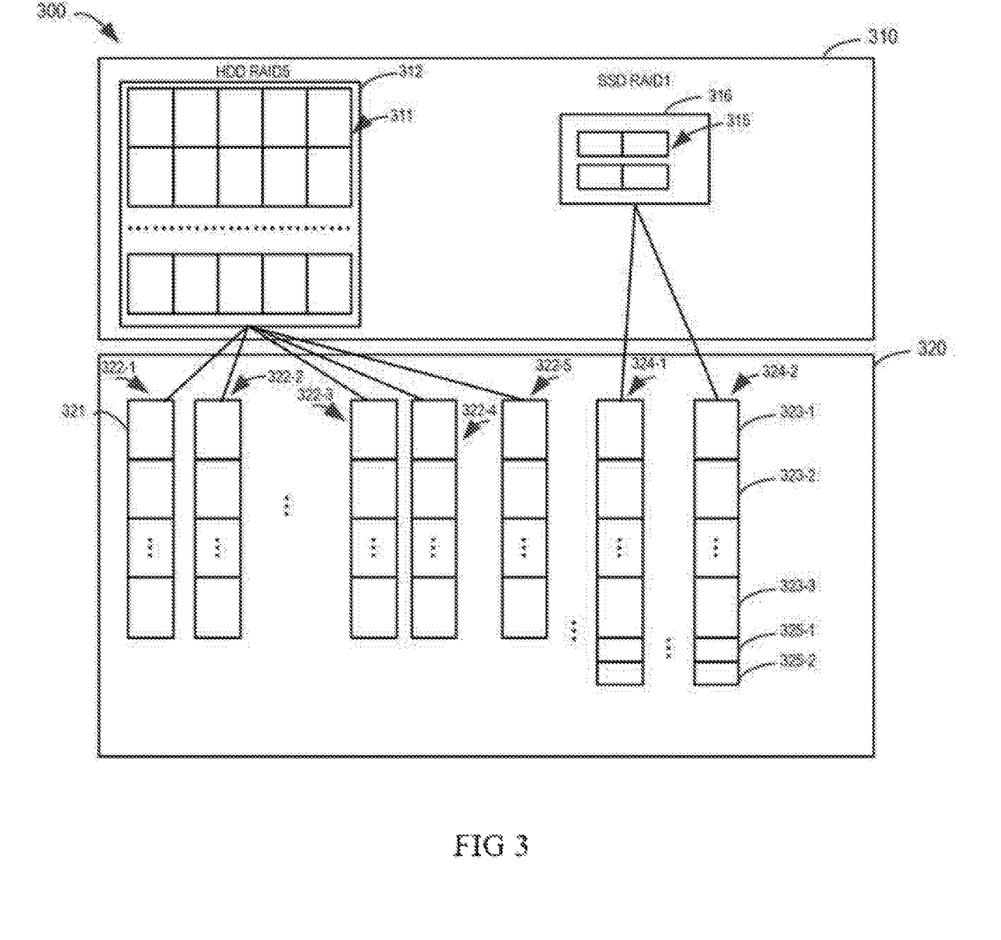
FIG. 3 illustrates a block diagram of architecture 300 for managing a hybrid storage disk array according to embodiments of the present disclosure.

FIG. 3 illustrates a block diagram of architecture 300 for managing a hybrid storage disk array according to embodiments of the present disclosure. The architecture 300 includes a hybrid RAID virtualization layer 310 and a hybrid physical storage layer 320. The hybrid physical storage layer 320 consists of two types of physical disks: HDD physical disk (e.g., 322-1, 322-2, . . . , 322-3, 322-4 and 322-5, the HDD physical disks being collectively or individually known as HDD physical disk 322) and SSD physical disks (such as 324-1 and 324-2, the SSD physical disks being collectively or individually known as SSD physical disk 324), for providing physical storage space. Each HDD physical disk 322 is divided into a plurality of HDD extents 321, wherein each of the plurality of HDD extents 321 can have the same storage capacity. In some embodiments, the HDD extent 321 can only store data in the data portion (as shown in FIG. 2). Each SSD physical disk 324 is divided into a plurality of SSD extents 323-1, 323-2, . . . , 323-3 (these SSD extents can be collectively or individually known as SSD extent 323), 325-1 and 325-2 (these SSD extents can be collectively or individually known as SSD extent 325), wherein each of the plurality of SSD extents 323 can have the same storage capacity for storing data in the data portion (shown in FIG. 2) while each of the plurality of SSD extents 325 can have the same storage capacity for storing data in the metadata portion (shown in FIG. 2). The HDD extent 321 and the SSD extents 323 and 325 sometimes can also be known as disk extension, storage unit and the like, whereas the hybrid physical storage layer 320 can also be known as hybrid disk pool. In some cases, one or more new disks can be added into the hybrid physical storage layer 320 to expand storage capacity.

As shown in FIG. 3, the hybrid RAID virtualization layer 310 includes HDD RAID5 312 and SSD RAID1 316. The HDD RAID5 312 consists of a plurality of HDD extent slices 311. The data portion of each HDD extent slice 311 is mapped to one or more HDD extents 321 of the hybrid physical storage layer 320, while the metadata portion is allocated to one or more SSD extents 325 of the hybrid physical storage layer 320. The SSD RAID1 316 consists of a plurality of SSD extent slices 315. The data portion of each SSD extent slice 315 is mapped to one or more SSD extents 323 of the hybrid physical storage layer 320, while the metadata portion is allocated to one or more SSD extents 325 of the hybrid physical storage layer 320.

In general, only 2 MB of the SSD extents 325 is required for storing metadata corresponding to 1 TB of the HDD extent 321. Even if a RAID1 virtualization is performed on the SSD extents 325, only 4 MB is needed. Therefore, those skilled in the art would appreciate that the above method is feasible and the I/O response efficiency of the hybrid physical storage layer 320 can be greatly improved in the manner described above.

Figure 4:
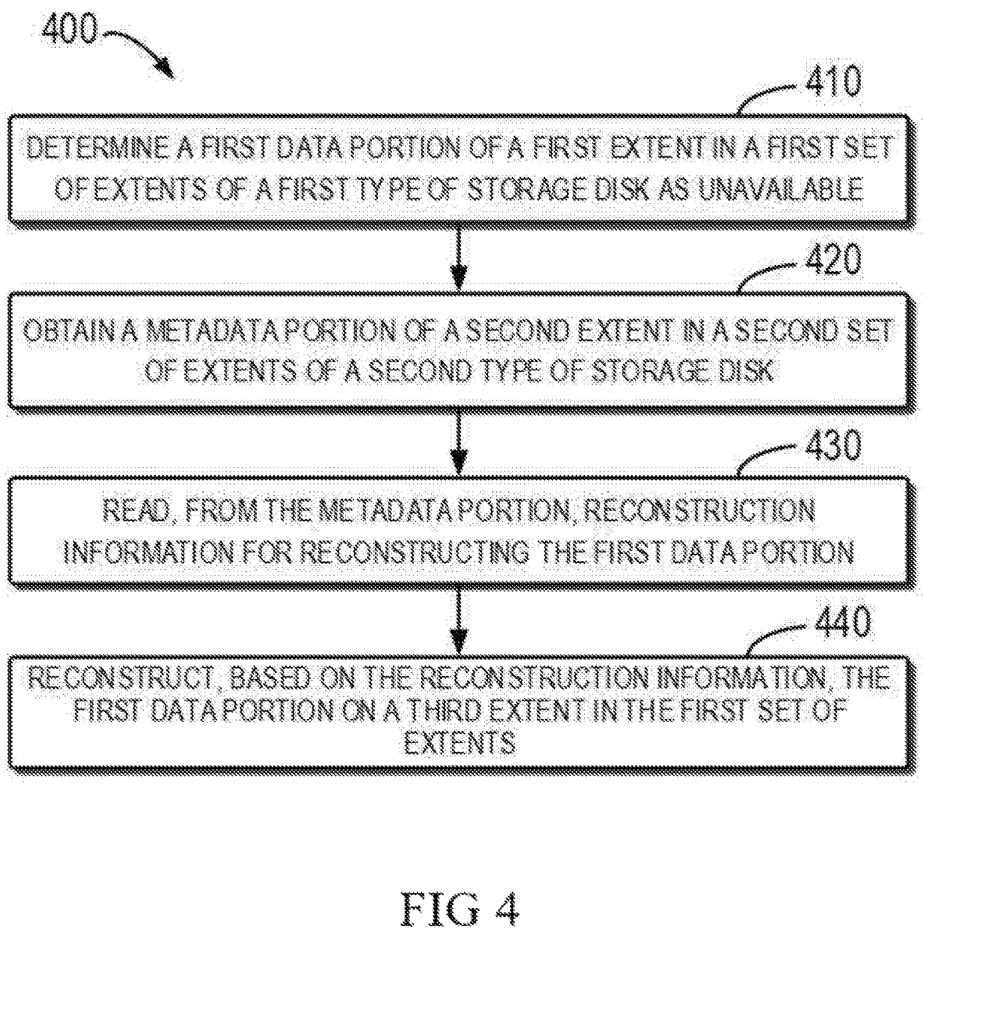
FIG. 4 illustrates a block diagram of a method 400 for managing a hybrid storage disk array according to embodiments of the present disclosure.

FIG. 4 illustrates a block diagram of a method 400 for managing a hybrid storage disk array according to embodiments of the present disclosure. The method 400 can be implemented through the architecture 300 of FIG. 3. For the purpose of discussion, the method 400 will be described with reference to FIG. 3.

At 410, an HDD extent 321 of one or more HDD physical disks 322 in the hybrid physical storage layer 320 is determined unavailable. The determination procedure, for example, can be triggered by a user accessing the HDD extent 321 in the hybrid physical storage layer 320, or by a self-check system of the architecture 300. Those skilled in the art can understand that other trigger methods can also be employed, for example, the HDD extent 321 is depleted or the HDD physical disk 322 in which the HDD extent 321 is located is removed.

At 420, a metadata portion stored in the SSD extents 325 of the one or more SSD physical disks 324 of the hybrid physical storage layer 320 is obtained. Generally, a plurality of SSD extents included in the one or more SSD physical disks 324 of the hybrid physical storage layer 320 are divided into two types. One type of SSD extent 323 stores the data portion of the SSD extent slice 315 and the other type of SSD extent 325 stores the metadata portion of the SSD extent slice 315. In addition, a part of the SSD extents 325 is also used for storing the metadata portion of the HDD extent slice 311. It has become an important problem for implementing embodiments of the present disclosure to effectively and accurately find the SSD extent 325 that stores both the metadata portion of the SSD extent slice 315 and the metadata portion of the HDD extent slice 311.

To solve this problem, various embodiments of the present disclosure provide the following implementations. Those skilled in the art would appreciate that the following implementation is only an example and other implementations can also be adopted to select the SSD extent 325 that also stores the metadata portion of the HDD extent slice 311.

In one embodiment, it is determined whether an I/O load of a candidate SSD extent 325 is below a threshold, wherein the I/O load is determined based on the number of I/O being processed by the candidate SSD extent 325 and a maximum allowed number of I/O. For example, if the I/O load of the candidate SSD extent 325 is below 70% (the threshold 70% is only exemplary and is not intended for restricting the protection scope; any other suitable values are also feasible), it means that the candidate SSD extent 325 is not frequently accessed and therefore can be selected to store both the metadata portion of the SSD extent slice 315 and the metadata portion of the HDD extent slice 311.

In another embodiment, it is determined that degree of wear of the candidate SSD extent 325 is below a threshold, wherein the degree of wear is determined based on the times that the candidate SSD extent 325 has been erased and allowed times of erasures. For example, if the degree of wear of the candidate SSD extent 325 is below 70% (the threshold 70% is only exemplary and is not intended for restricting the protection scope; any other suitable values are also feasible), it means that the service life of the candidate SSD extent 325 is still long and therefore can be selected to store both the metadata portion of the SSD extent slice 315 and the metadata portion of the HDD extent slice 311.

In a further embodiment, it is determined that a usage rate of the candidate SSD extent 325 is below a threshold, wherein the usage rate is determined based on an occupied space of the candidate SSD extent 325 and a maximum allowed space. For example, if the usage rate of the candidate SSD extent 325 is below 70% (the threshold 70% is only exemplary and is not intended for restricting the protection scope; any other suitable values are also feasible), it means that the candidate SSD extent 325 has not been fully used and therefore can be selected to store both the metadata portion of the SSD extent slice 315 and the metadata portion of the HDD extent slice 311.

At 430, the reconstruction information is read from the metadata portion for reconstructing the HDD extent 321 that is determined as unavailable at 410. Based on physical characteristics of HDD and SSD, the access speed of the SSD physical disk 324 far exceeds that of the HDD physical disk 322. Therefore, it can greatly reduce the reconstruction time of the HDD extent 321 by reading information from the SSD physical disk 324 that can be accessed faster, and the effect will become more apparent especially when faults frequently occur in the HDD extent 321 of the hybrid physical storage layer 320. It is certain that those skilled in the art would appreciate the HDD physical disk 322 and the SSD physical disk 324 included in the hybrid physical storage layer 320 are only examples, and the hybrid physical storage layer 320 can also be composed of other physical disks having different access speeds.

At 440, the HDD extent 321 determined as unavailable at 410 is reconstructed on a further HDD extent 321 of the HDD physical disk 322 based on the reconstruction information read at 430.

According to the method 400, by allocating the metadata portion in the HDD extent slice 311 to the SSD extent 325 instead of the HDD physical disk 322 as in the prior art, the HDD extent 321 can be reconstructed sooner based on different access speeds of different physical disks when a fault occurs.

Figure 5:
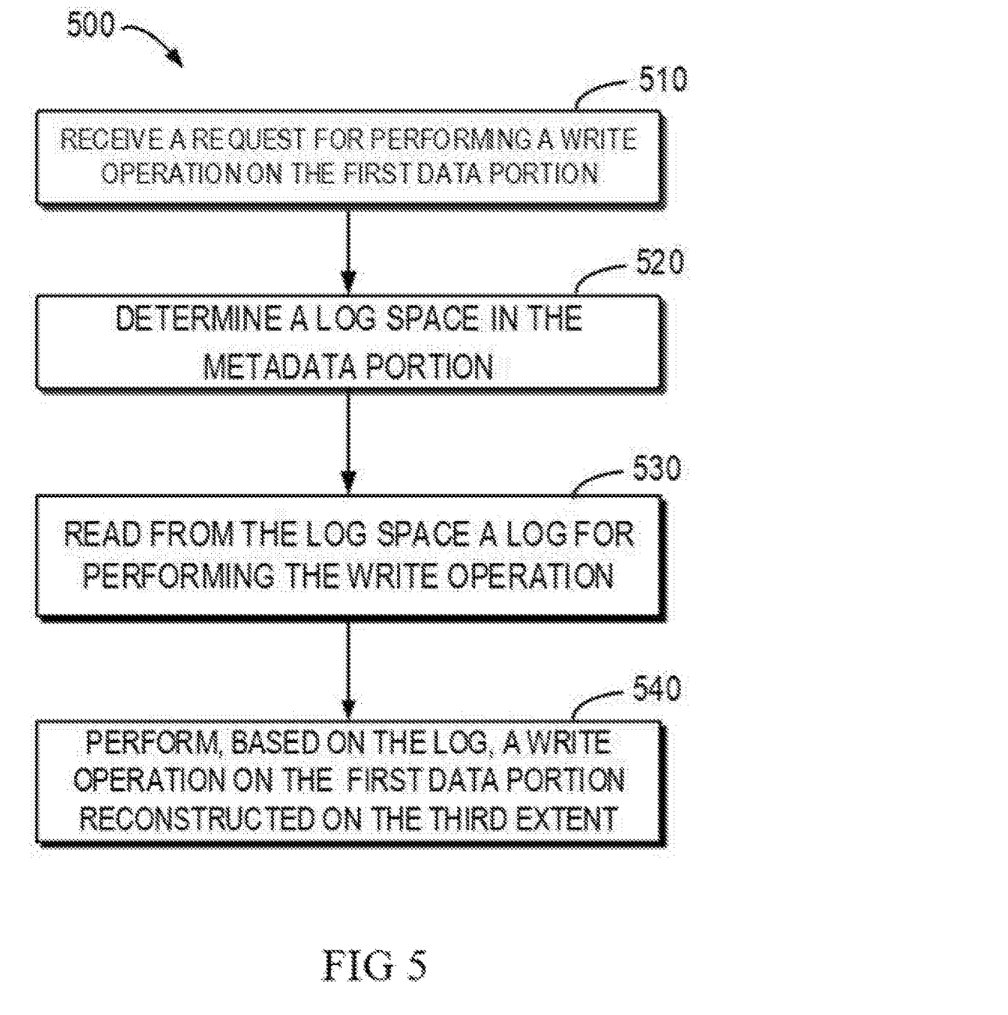
FIG. 5 illustrates a method 500 for write operations according to embodiments of the present disclosure.

In addition, FIG. 5 illustrates a method 500 for write operations according to embodiments of the present disclosure. The method 500 can be interpreted as an special case of the method 400. Specifically, when a write operation is performed on the unavailable HDD extent 321, in addition to the requirement of firstly reconstructing the HDD extent 321, it is also required that the logs related to the write operations are stored during the reconstruction of the HDD extent 321, so as to perform write operations on the reconstructed HDD extent 321 after the reconstruction is completed. The method 500 can also be implemented through the architecture 300 of FIG. 3. For the purpose of discussion, the method 500 will be described with reference to FIGS. 3 and 4.

At 510, a request for performing write operations on the HDD extent 321 determined as unavailable at 410 is received. It should be understood that the write operations can include information, such as data to be written into the HDD extent 321, a start position of the write operation performed on the HDD extent 321 and the like, and the information is collectively known as logs here.

At 520, a log space in the metadata portion stored in the SSD extent 325 is determined. The log space refers to a log space for storing write operations during the reconstruction of the unavailable HDD extent 321, so as to perform write operations on the reconstructed HDD extent 321 after the reconstruction is completed. Similar to the metadata portion of the HDD extent slice 311, the log space is also allocated to the SSD extent 325. That is, a part of the SSD extent 325 also stores the log space for use by the write operations. The method of selecting the SSD extent 325 that also stores the log space for use by the write operations is similar to the method of selecting the SSD extent 325 that stores both the metadata portion of the SSD extent slice 315 and the metadata portion of the HDD extent slice 311, and will not be repeated here.

At 530, a log is read from the log space for performing the write operations on the HDD extent 321. Based on the description above, the SSD physical disk 324 has a much higher access speed than the HDD physical disk 322 due to the physical characteristics of HDD and SSD. Therefore, it can greatly reduce the time for performing the write operations on the HDD extent 321 by reading the log from the SSD physical disk 324 that can be accessed faster. It is certain that those skilled in the art would appreciate the HDD physical disk 322 and the SSD physical disk 324 included in the hybrid physical storage layer 320 of the present disclosure are examples only, and the hybrid physical storage layer 320 can also be composed of other physical disks having different access speeds.

At 540, the write operations are performed on a reconstructed HDD extent 321 on a further HDD extent 321 of the HDD physical disk 322 based on the log read at 530.

It should be understood that although each step has been discussed above and illustrated in FIG. 5 in a particular order, it is unnecessary that these steps should be executed according to the shown order. In some embodiments, some of the steps in the method 500 can be executed in parallel, or in an adjusted order. For example, determination of the log space at 520 can be executed in parallel with receiving the write operation request.

Figure 6:
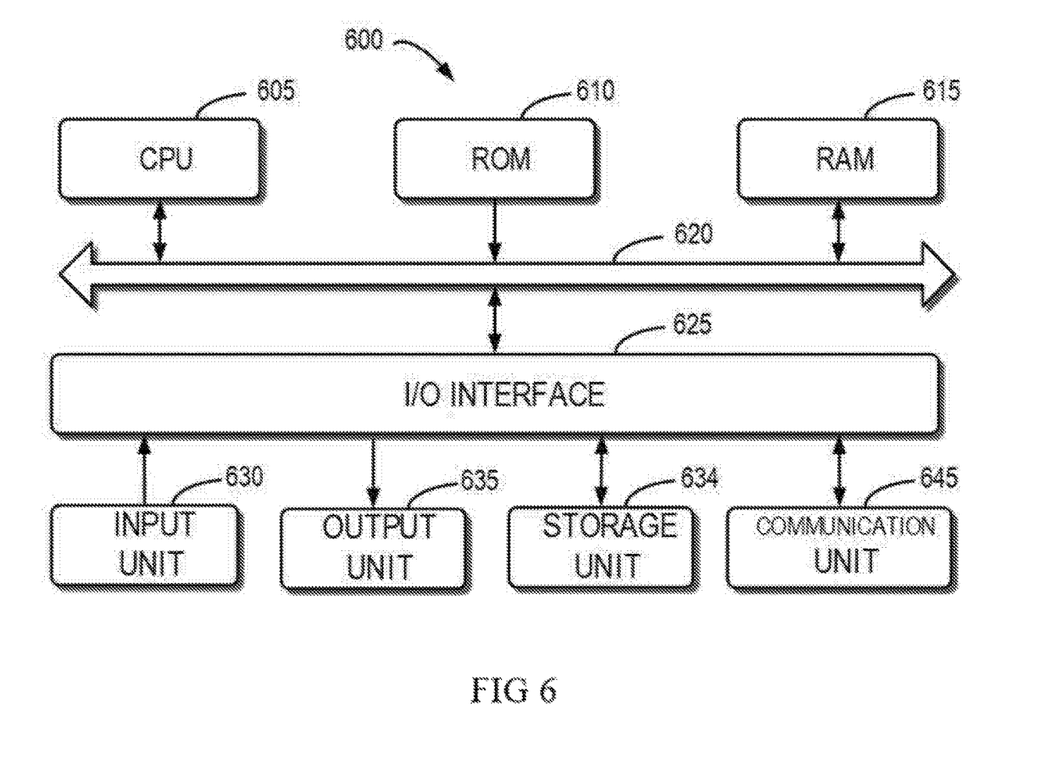
FIG. 6 illustrates a schematic block diagram of an example device 600 for implementing embodiments of the present disclosure.

FIG. 6 illustrates a schematic block diagram of an example device 600 for implementing embodiments of the present disclosure. As shown, the device 600 includes a central process unit (CPU) 605, which can execute various suitable actions and processing based on computer program instructions stored in a read-only memory (ROM) 610 or computer program instructions loaded to a random-access memory (RAM) 615 from a storage unit 640. The RAM 615 can also store various programs and data required by the operations of the device 600. CPU 605, ROM 610 and RAM 615 are connected to each other via a bus 620. An input/output (I/O) interface 625 is also connected to the bus 620.

A plurality of components in the device 600 are connected to the I/O interface 625, including: an input unit 630, such as a keyboard, a mouse and the like; an output unit 635, such as various types of displays and loudspeakers and the like; a storage unit 640, such as a disk, an optical disk, an HDD array and an SSD array and the like; and a communication unit 645, such as a network card, a modem, a wireless transceiver and the like. The communication unit 645 allows the device 600 to exchange information/data with other devices via the computer network, such as Internet, and/or various telecommunication networks.

Each procedure and processing described above, such as example methods 400 and 500, can be executed by the central processing unit 605. For example, in some embodiments, the methods 400 and 500 can be implemented as computer software programs tangibly included in the machine-readable medium, e.g., storage unit 640. In some embodiments, the computer program can be partially or fully loaded and/or mounted to the device 600 via the ROM 610 and/or the communication unit 645. When the computer program is loaded to the RAM 615 and executed by the CPU 605, one or more steps in the example methods 400 and/or 500 described above can be implemented. Alternatively, in other embodiments, the central processing unit 605 can also be configured via other suitable manners (such as firmware) to perform the above procedure/method.

From the description above, it can be seen that embodiments of the present disclosure significantly improve the I/O performance of the hybrid physical storage layer by allocating the metadata portion of the storage disk with a lower access speed to the storage disk with a higher access speed, especially when faults frequently occur to the storage disk with a lower access speed in the hybrid physical storage layer and when the write operations are frequently performed on the faulted storage disk with a lower access speed.

The present disclosure can be a method, an apparatus, a system and/or a computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by a device, a method and a computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the disclosure aims to best explain principles and actual applications of each embodiment and technical improvements made in the market by each embodiment, or enable other ordinary skilled in the art to understand embodiments of the present disclosure.

I claim:

1. A method for managing a hybrid storage disk array, wherein the hybrid storage disk array comprises a first type of storage disk and a second type of storage disk, the method including:
   in response to a first data portion of a first extent in a first set of extents of the first type of storage disk being unavailable, obtaining a metadata portion of a second extent in a second set of extents of the second type of storage disk;
   reading, from the metadata portion, reconstruction information for reconstructing the first data portion;
   reconstructing, based on the reconstruction information, the first data portion on a third extent in the first set of extents;
   in response to performing a write operation on the first data portion, determining a log space in the metadata portion;
   reading, from the log space, a log for performing the write operation; and
   performing, based on the log, a write operation on the first data portion reconstructed on the third extent.

2. The method of claim 1, wherein an input/output (I/O) load of the second extent in which the metadata portion is included is below a threshold, the I/O load being determined based on the number of I/O being processed by the second extent and a maximum allowed number of I/O.

3. The method of claim 1, wherein a degree of wear for the second extent in which the metadata portion is included is below a threshold, the degree of wear being determined based on times the second extent has been erased and allowed times of erasures.

4. The method of claim 1, wherein a usage rate of a second data portion in the second extent in which the metadata portion is included is below a threshold, the usage rate being determined based on an occupied space of the second data portion and a maximum allowed space.

5. The method of claim 1, wherein an access speed of the second type of storage disk exceeds an access speed of the first type of storage disk.

6. The method of claim 1, wherein the first type of storage disk is a hard disk drive, and the second type of storage disk is a solid-state drive.

7. The method of claim 1, further comprising:
   prior to obtaining the metadata portion of the second extent in the second set of extents of the second type of storage disk, obtaining a metadata portion of a fourth extent in the second set of extents of the second type of storage disk, and storing the metadata portion of the fourth extent in the second extent in the second set of extents of the second type of storage disk.

8. A device for managing a hybrid storage disk array, wherein the hybrid storage disk array comprises a first type of storage disk and a second type of storage disk, the device including:
   a processor; and
   a memory coupled to the processor and having instructions stored thereon for execution by the processor, the instructions, when executed by the processor, causing the device to:
      in response to a first data portion of a first extent in a first set of extents of the first type of storage disk being unavailable, obtain a metadata portion of a second extent in a second set of extents of the second type of storage disk;
      read, from the metadata portion, reconstruction information for reconstructing the first data portion;
      reconstruct, based on the reconstruction information, the first data portion on a third extent in the first set of extents;
      in response to performing a write operation on the first data portion, determine a log space in the metadata portion;
      read, from the log space, a log for performing the write operation; and
      perform, based on the log, a write operation on the first data portion reconstructed on the third extent.

9. The device of claim 8, wherein an input/output (I/O) load of the second extent in which the metadata portion is included is below a threshold, the I/O load being determined based on the number of I/O being processed by the second extent and a maximum allowed number of I/O.

10. The device of claim 8, wherein a degree of wear for the second extent in which the metadata portion is included is below a threshold, the degree of wear being determined based on times the second extent has been erased and allowed times of erasures.

11. The device of claim 8, wherein a usage rate of a second data portion in the second extent in which the metadata portion is included is below a threshold, the usage rate being determined based on an occupied space of the second data portion and a maximum allowed space.

12. The device of claim 8, wherein an access speed of the second type of storage disk exceeds an access speed of the first type of storage disk.

13. The device of claim 8, wherein the first type of storage disk is a hard disk drive, and the second type of storage disk is a solid-state drive.

14. The device of claim 8, wherein the instructions, when executed by the processor, further cause the device to:
   prior to obtaining the metadata portion of the second extent in the second set of extents of the second type of storage disk, obtain a metadata portion of a fourth extent in the second set of extents of the second type of storage disk, and store the metadata portion of the fourth extent in the second extent in the second set of extents of the second type of storage disk.

15. A computer program product having a non-transitory computer-readable medium which stores a set of instructions to manage a hybrid storage disk array; the set of instructions, when carried out by computerized circuitry, causing the computerized circuitry to perform a method including:
   in response to a first data portion of a first extent in a first set of extents of a first type of storage disk being unavailable, obtaining a metadata portion of a second extent in a second set of extents of a second type of storage disk;
   reading, from the metadata portion, reconstruction information for reconstructing the first data portion;
   reconstructing, based on the reconstruction information, the first data portion on a third extent in the first set of extents;
   in response to performing a write operation on the first data portion, determining a log space in the metadata portion;
   reading, from the log space, a log for performing the write operation; and
   performing, based on the log, a write operation on the first data portion reconstructed on the third extent.

16. The computer program product of claim 15, wherein an input/output (I/O) load of the second extent in which the metadata portion is included is below a threshold, the I/O load being determined based on the number of I/O being processed by the second extent and a maximum allowed number of I/O.

17. The computer program product of claim 15, wherein a degree of wear for the second extent in which the metadata portion is included is below a threshold, the degree of wear being determined based on times the second extent has been erased and allowed times of erasures.

18. The computer program product of claim 15, wherein a usage rate of a second data portion in the second extent in which the metadata portion is included is below a threshold, the usage rate being determined based on an occupied space of the second data portion and a maximum allowed space.

19. The computer program product of claim 15, wherein an access speed of the second type of storage disk exceeds an access speed of the first type of storage disk.

20. The computer program product of claim 15, wherein the method further includes:
   prior to obtaining the metadata portion of the second extent in the second set of extents of the second type of storage disk, obtaining a metadata portion of a fourth extent in the second set of extents of the second type of storage disk, and store the metadata portion of the fourth extent in the second extent in the second set of extents of the second type of storage disk.

* * * * *